United States Patent [19]
Alon et al.

[11] Patent Number: 5,950,185
[45] Date of Patent: Sep. 7, 1999

[54] APPARATUS AND METHOD FOR APPROXIMATING FREQUENCY MOMENTS

[75] Inventors: Noga Alon, Tel Aviv, Israel; Yossi Matias, Montgomery, Md.; Mario Szegedy, Union, N.J.

[73] Assignee: Lucent Technologies Inc., Murray Hill, N.J.

[21] Appl. No.: 08/861,415

[22] Filed: May 21, 1997

Related U.S. Application Data

[60] Provisional application No. 60/017,950, May 20, 1996.

[51] Int. Cl.[6] .................................................. G06F 17/00
[52] U.S. Cl. .................................................. 707/1; 707/2
[58] Field of Search .................................... 707/2, 103, 1, 707/9; 704/9; 1/1

[56] References Cited

U.S. PATENT DOCUMENTS

| 4,956,774 | 9/1990 | Shibamiya et al. | 707/2 |
| 5,251,131 | 10/1993 | Masand et al. | 704/9 |
| 5,404,509 | 4/1995 | Klein | 707/101 |
| 5,542,089 | 7/1996 | Lindsay et al. | 707/2 |
| 5,675,786 | 10/1997 | McKee et al. | 707/103 |
| 5,675,789 | 10/1997 | Ishii et al. | 1/1 |
| 5,689,696 | 11/1997 | Gibbons et al. | 1/1 |
| 5,721,896 | 2/1998 | Ganguly et al. | 1/1 |
| 5,758,338 | 5/1998 | Faloutsos et al. | 707/6 |

OTHER PUBLICATIONS

Salem et al., "Probabilistic Diagnosis of Hot Spots", IEEE Comput. Soc. Press, pp. 30–39, 1992.

*Primary Examiner*—Wayne Amsbury
*Assistant Examiner*—Thuy Pardo

[57] ABSTRACT

A method for estimating frequency moments of a database, the frequency moments $F_k$ of a sequence containing $m_i$ elements of type i, for $1<i<n$, being $$\sum_{i=1}^{n} m_i^k$$

for each $k \geq 0$. The method entails receiving a sequence of data elements for input to the database; selecting a subset of the sequence of data elements; initializing a counter corresponding to each data element of the subset; comparing data elements input to the database with each data element in the subset and incrementing counters of subset elements which correspond to the input data elements; computing a random variable for each data item in the subset, which depends on the counter of this subset item; and, processing the plurality of random variables to determine an estimate of the frequency moment. The estimated frequency moment is optimized to be accurate with a high degree of confidence.

8 Claims, 3 Drawing Sheets

APPARATUS AND METHOD FOR APPROXIMATING FREQUENCY MOMENTS

RELATED APPLICATIONS

This application claims the benefit of provisional U.S. Patent Application Ser. No. 60/017,950, filed May 20, 1996.

FIELD OF THE INVENTION

The present invention relates generally to database applications and, in particular, methodology for achieving on-demand estimation of frequency distribution of data.

BACKGROUND OF THE INVENTION

It is often desirable to obtain characteristics about the distribution of data stored in databases. For instance, useful characteristics of a sales database includes the number of types of products or services that sold for greater than a particular amount, the number of distinct product or service types that account for a particular percentage of sales, and particular characteristics of subsets/supersets of sales information. One known method for determining such information would be to sort through the database each time such characteristic information is requested. However, often times databases are very large. Accordingly, since all database entries would need to be accessed to determine the needed characteristics, such systems would disadvantageously be to process the information requests.

As a consequence, more recent database systems have predicted such characteristic information based on high-biased histograms maintained for the respective databases. A high-biased histogram is a representation, such as a graph or list, of a particular number of the most frequently occurring categories of items in a data set. The most frequently occurring categories of items are advantageously determined by a count associated with each item category wherein the larger the count, the more frequently occurring that category of items. For example, a high-biased histogram can be used to represent a list of the ten top selling types of products for a business and the amount of sales for each of such products. High-biased histograms and their advantages are described in Y. E. Ioannidis and S. Christodoulakis, "Optimal Histograms for limiting Worst-Case Error Propagation in the Size of Join Results," *ACM Trans. Database Sys.*, vol. 18, No. 4, pp. 709–748 (December 1993). Commercially available database systems, such as Dbase II®, have the ability to generate or report high-biased histograms.

The frequency moments of a data set represent important demographic information about the data, and are important features in the context of database applications. In particular, the frequency moment $F_0$ is the number of distinct elements appearing in a sequence, the frequency moment $F_1(=m)$ is the length of the sequence, and the frequency moment $F_2$ is the repeat rate or Gini's index of homogeneity needed in order to compute the surprise index of the sequence (see, e.g., J. Good, Surprise indexes and P-values, J. Statistical Computation and Simulation 32 (1989), 90–92. As described in the reference P. J. Haas, J. F. Naughton, S. Seshadri, and L. Stokes, *Sampling-Based Estimation of the Number of Distinct Values of an Attribute*, Proc. of the 21$^{st}$ VLDB Conf., 1995, 311–322, the contents and disclosure of which is incorporated by reference as if fully set forth herein, virtually all query optimization methods in relational and object-relational database systems require a mechanism for assessing the number of distinct values of an attribute in a relation, i.e., the frequency moment $F_0$ for the sequence consisting of the relation attribute.

An important attribute is the second frequency moment of a data set which represents how far from being uniform the frequency distribution of the items in the data set are and is a useful characteristic for guiding the computation in several applications of modem database systems. Furthermore, the second frequency moment, i.e., $F_k$ for $k \geq 2$, indicates the degree of skew of the data, that is a major consideration in many parallel database applications. Thus, for example, as discussed in D. J. DeWitt, J. F. Naughton, D. A. Schneider, and S. Seshadri, *Practical skew handling in parallel joins*, Proc. 18$^{th}$ Int'l. Conf. On Very Large Data Bases, pp. 27, 1992, the contents and disclosure of which is incorporated by reference as if fully set forth herein, the degree of the skew may determine the selection of algorithms for data partitioning. In particular, as discussed in Y. E. Ioannidis and V. Poosala, *Balancing Histogram Optimality and Practicality for Query Result Size Estimation*, Proc. ACM-SIGMOD 1995, the contents and disclosure of which is incorporated by reference as if fully set forth herein, the frequency moment $F_2$ may be used for error estimation in the context of estimating query result sizes and access plan costs. This method is based on selecting appropriate histograms for a small number of values to approximate the frequency distribution of values in the attributes of relations. The selection involves joining a relation with itself (frequency moment $F_2$ is the output size of such join).

The above mentioned Haas et al. reference considers sampling based algorithms for estimating frequency moment $F_0$, and proposed a hybrid approach in which the algorithm is selected based on the degree of skew of the data, measured essentially by the frequency moment $F_2$.

Since skew information plays an important role for many applications, it would be beneficial to maintain estimates for frequency moments; and, most notably, for the frequency moment $F_2$. For efficiency purposes, the computation of estimates for frequency moments of a relation should preferably be done and updated as the records of the relation are inserted to the database. The general approach of maintaining views, such as distribution statistics, of the data has been well-studied as the problem of incremental view maintenance. Note that conventionally, it is straightforward to maintain the (exact) frequency moments by maintaining a full histogram on the data, i.e., maintaining a counter $m_i$ for each data value $i \in \{1,2,\ldots,n\}$ which requires memory of size at least the order of "n" ($\Omega(n)$), where n is the number of possible values. For very large datasets this may be impractical as large memory requirements would require storing the data structures in external memory, which would imply an expensive overhead in access time and update time. Thus, it is important that the memory used for computing and maintaining the estimates be limited. The restriction on memory size is further emphasized by the observation that sometimes incoming data records will belong to different relations that are stored in the database; each relation requiring its own separate data structure. Thus, the problem of computing or estimating the frequency moments in one pass under memory constraints arises naturally in the study of databases.

There are several known randomized algorithms that approximate frequency moments $F_0$ and $F_1$ using limited memory. However, currently there exists no randomized algorithm for estimating the frequency moment $F_k$, where $k>1$, that can guarantee high accuracy with high probability, using small amount of memory space.

It would thus be highly desirable to obtain tight bounds to achieve a reduced memory requirement necessary in approximating the frequency moments $F_k$, where $k>1$, without the need for raiding the dataset.

SUMMARY OF THE INVENTION

The instant invention presents new and efficient method for reporting of a data set skew or other statistical frequency moment data of a database for query applications. In accordance with the invention, a relatively small amount of memory is usable to maintain a table for a sample set of item records with corresponding counters. As a new item is entered in the database, a determination is made as to whether the new input item has values represented in the sample table. When a new item is entered having a corresponding record in the sample table, its corresponding item record counter is updated, such as, by incrementing. A subsequent determination is also made as to whether a new data item not represented in the table should have a corresponding record added to the table. Thus, the new item can be added to the table, possibly replacing one of the items currently in the table. The selection of whether or not the item is added to the table is done with a particular probability. The estimate of the frequency moment is derived from computing a function of the recorded frequency of the items in the table, and taking averages and medians for better accuracy and reliability.

Advantageously, the invention determines the estimation of frequency moments $F_k (k \geq 0)$ with relatively reduced memory requirements, and particularly, for every k>0, $F_k$ can be approximated randomly using on the order of $n^{1-1/k}$ log(n+m) memory locations, where n is the number of possible values and m is the length of the database sequence. Particularly advantageous is the fact that the method of the invention requires relatively reduced memory to approximate the frequency moment $F_2$ (Second Frequency Moment).

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

Figure 1:
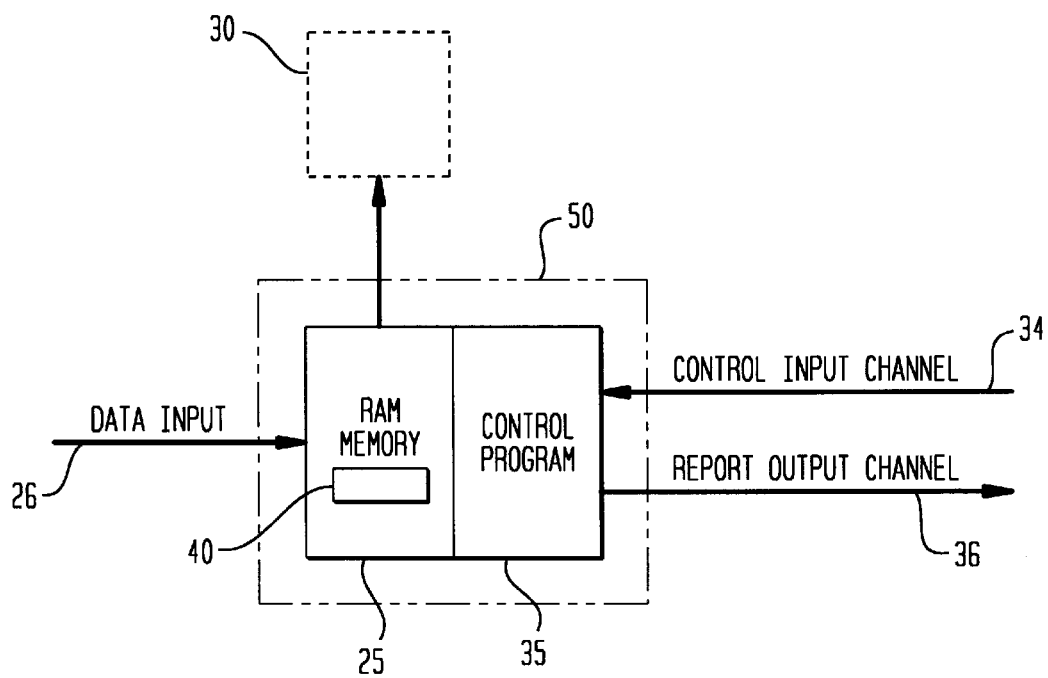
FIG. 1 is a block diagram of the system used in calculating frequency moments for large databases.

The inventive system implementing the randomized algorithm for estimating the frequency moment is generally illustrated in FIG. 1. As shown in FIG. 1, the system requires a small control program 35 and a memory area 25 which, for example, may be resident in a database server 50 supporting database 30. Every data item to be input to a database 30 is input through a data input channel 26 where the data item is processed by control program 35. The control program formulates a sample table 40 of select data items input to the database and maintains counter elements (not shown) that corresponds to the data items selected.

As described herein, the sample table 40 is maintained in a memory space 25. As will be explained, the database items which are maintained in the table 40 may be determined a priori, or may be determined on demand. When a command is received over control channel 34 to provide an estimate of the frequency moment, the control program 35 is invoked to process the data stored in limited memory space 40 and generate the estimated frequency moment for output on output channel line 36. As is generally known, the demand may be received from a query optimization program or other database programs running in the same or remote database server.

The overall algorithm 100 of the invention is depicted in the flow charts of FIGS. 2(a)–2(d). To facilitate understanding of the algorithm, the following notations are defined:

m—represents the length of the input sequence;
M—represents the (expected) size of the sample;
n—represents the number of different possible values, i.e., values i are from $\{1,2,\ldots,n\}$;
A—represents the input sequence;
$a_j$ (j=1, . . . ,m)—represents the elements in A: $A=\{a_1, a_2, \ldots, a_m\}$;
k—represents the degree of the frequency moment;
$m_i$—represents the number of elements $a_j$ of value i, that is, $(m_i=|\{j: a_j=i\}|)$; and,
$F_k$—represents the frequency moments and $$F_k = \sum_{i=1}^{n} m_i^k$$

for each $k \geq 0$.

For purposes of description, the algorithm 100 is divided into two major aspects: a first aspect 101 relating to the receipt of a data item having a value associated with it, and, a second aspect 201 relating to the request and calculation of a frequency moment. In the first aspect, as indicated at step 110 in FIG. 2(a), a check is made as to whether a new data item is received. Specifically, if a new data item has been received, it is read from the system data input channel (FIG. 1). Then, at step 120 a sample table is appropriately updated in the manner as described herein. In the second aspect, as indicated at step 130, a calculation of a frequency moment is performed in response to a request, and, at step 140, the frequency moment estimate is reported to the requesting application.

According to the principles of the invention, there is computed a frequency function $F(m_1, m_2, \ldots, m_n)$ for a dataset $A=(a_1, a_2, \ldots, a_m)$ containing items with values from $[1,2,\ldots,n]$. Out of the sequence A, a sample subsequence of (approximately) M elements to be stored in a sample table are predetermined or selected on demand. For each sample element $a_p$, a count, $r_p$, will be computed as $r_p=|\{q: q \geq p, a_q=a_p\}|$, that is, the counter of each data element having a value represented in the table will be incremented whenever a data item having that value is received in the database. The count of each element of the sample subsequence is stored in a limited memory space using memory of size M. For purposes of illustration, the dataset may contain, e.g., $m=1\times 10^6$ (one million), items and, the memory requirements may dictate that the sample table consists of, e.g., 20 items (M=20). As will be explained, the counts $r_p$ will be used to compute an estimate for the frequency function $F(m_1, m_2, \ldots, m_n)$.

Figure 2A:
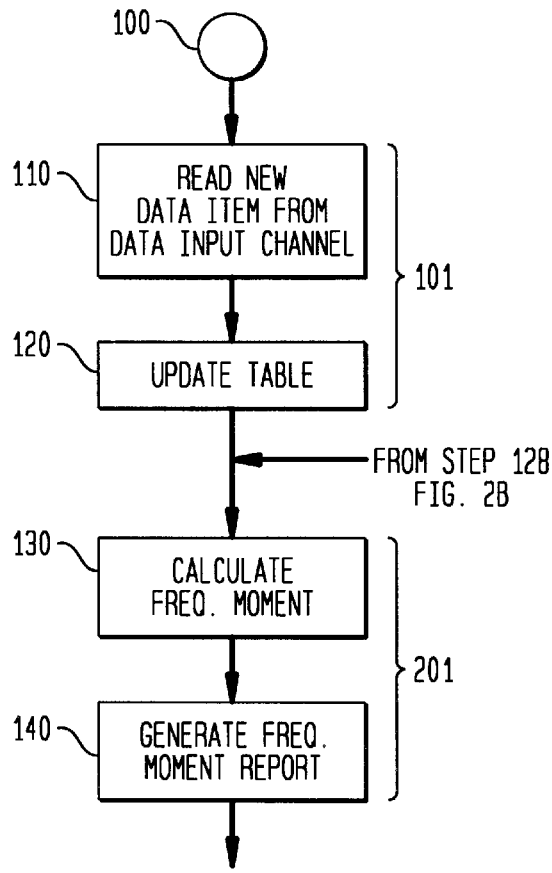
FIG. 2(a) is a block diagram illustrating the general algorithm implemented by the database server.
Figure 2B:
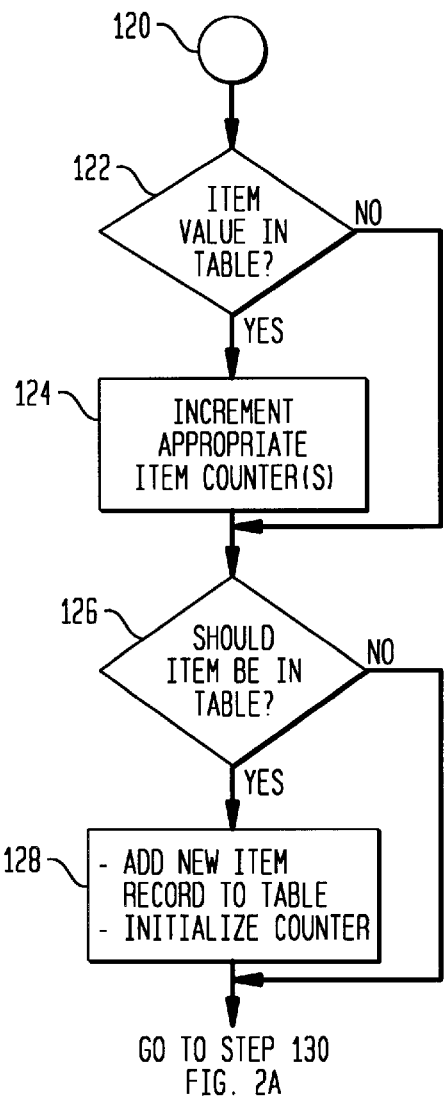
FIG. 2(b) is a block diagram illustrating the detailed steps of updating the sample table.
Figure 2C:
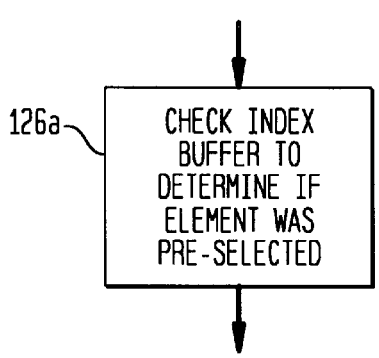
FIG. 2(c) illustrates a first embodiment for determining whether a data item input to the database should be represented in the sample table.

FIG. 2(b) illustrates the step of updating the sample table (step 120) of the algorithm 100. Particularly, as indicated at step 122, a determination is made as to whether the value of the particular data item value received is already represented in the sample table. If the data item received is already represented in the sample table, then, as indicated at step 124, the table element counts for that particular value are updated accordingly, i.e., its corresponding counters are incremented. More specifically, if the item has a value "x", for example, then it is necessary to determine if the value x is represented in the table 40. If yes, then the step 124 of updating the counters is performed as follows: for each sample element $a_p$, if $a_p = x$ then count $r_p$ is incremented. If at step 122, it is determined that the data item received was not represented in the sample table, the algorithm proceeds to step 126 to determine whether the received data item input should be represented in the table. This may be determined in one of two ways as follows:

In a first embodiment, as illustrated in FIG. 2(c), the select data items for maintenance in the sample histogram table are randomly predetermined, i.e., a predetermined number of indices are provided in a value buffer (not shown) that point to the M data elements that are to be represented in the sample table 40. Thus, for each new data item received, a determination is made as to whether the item(s) for the sample table have been preselected, i.e., is among the indices preselected to be included in the sample histogram table 40. As indicated at step 126a, FIG. 2(c), this involves checking the index buffer (not shown) to determine if the data item received was pre-selected to be in the sample table. If the item was not preselected to be in the table, the item is ignored and the algorithm proceeds to step 130 (FIG. 2(a)) to determine if a report is demanded and whether a frequency moment calculation is to be made. If the item was preselected, then a data record containing the representation of its value is added to the sample table at step 128 and a corresponding counter(s) is(are) initialized to a count of, e.g., one (1). The algorithm then continues at step 130 to determine whether a frequency moment calculation has been requested or, to wait for the next input data item. It should be understood that, for the rest of the sequence, whenever an item having a value that is represented in the table is read, the corresponding counter(s) in the table is (are) incremented so as to maintain the histogram on each of the small subset of values in the table 40.

Figure 2D:
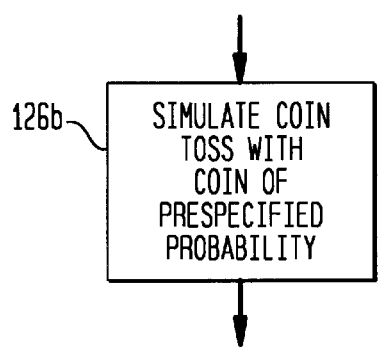
FIG. 2(d) illustrates a second embodiment for determining whether a data item input to the database should be represented in the sample table.

In a second embodiment, it may be the case that the data item(s) for the sample table are not preselected, and thus, may be determined probabilistically, on the fly. One method, as indicated at step 126b in FIG. 2(d), is to simulate a coin toss with a biased coin for each input item received. It should be understood that a pseudo-random number generator or other similar technique known to those skilled in the art may be used to simulate a coin toss with a biased coin of probability M/m with m and M as defined above. Thus, for example, with m=1,000,000 and M=20, the probability of a successful simulation coin toss would be approximately M/m=20/1,000,000=0.00002.

The outcome of the simulated coin toss will decide whether the value of the input data element should be represented in the sample table or not. If, for example, a "tails" occurs for the simulated coin toss, i.e., the pseudo-random generated number does not generate a number falling within the probability range, then the data item does not belong in the sample histogram table and the algorithm continues at step 130, FIG. 2(a), to wait for the next data item input or generate an estimate of the frequency moment. Conversely, as a result of the coin toss, if the generated number does fall within the probability range, then the data item belongs in the sample histogram table and the value of that data item is added to the table 40, as indicated at step 128 in FIG. 2(b). Furthermore, at step 128, when it is determined that a new data item element is to be added in the sample table, its counter(s) is(are) correspondingly initialized with a value 1.

It should be understood that other techniques, e.g., besides pseudo-random number generators, may be used to simulate the coin toss in a more or less efficient manner. Moreover, skilled artisans may be able to modify the procedures outlined in FIGS. 2(a) and 2(b) in any manner fit without departing from the principles described herein. For instance, each of steps 126a,b may be modified to check whether a sample table of quantity "M" elements has been filled in accordance with the limited memory requirements of the system. Additionally, the algorithm may be modified to account for the instance when a quantity of items, for example, are received at a time.

Additionally, it should be noted that skilled artisans will know how to modify the algorithm if it is necessary to allocate received sample data items received with particular database tables if more than one database sets have overlapping data elements.

Referring back to FIG. 2(b), after updating the element counter(s) at step 124 or deciding whether a new data item received should be represented in the table, the algorithm proceeds to step 130 of FIG. 2(a) to determine whether an on-the-fly frequency estimate has been requested. If so, then the algorithm proceeds to step 200 in FIG. 3, to compute the desired frequency moment of the entire database set from the item count(s) maintained in the sample table.

Figure 3:
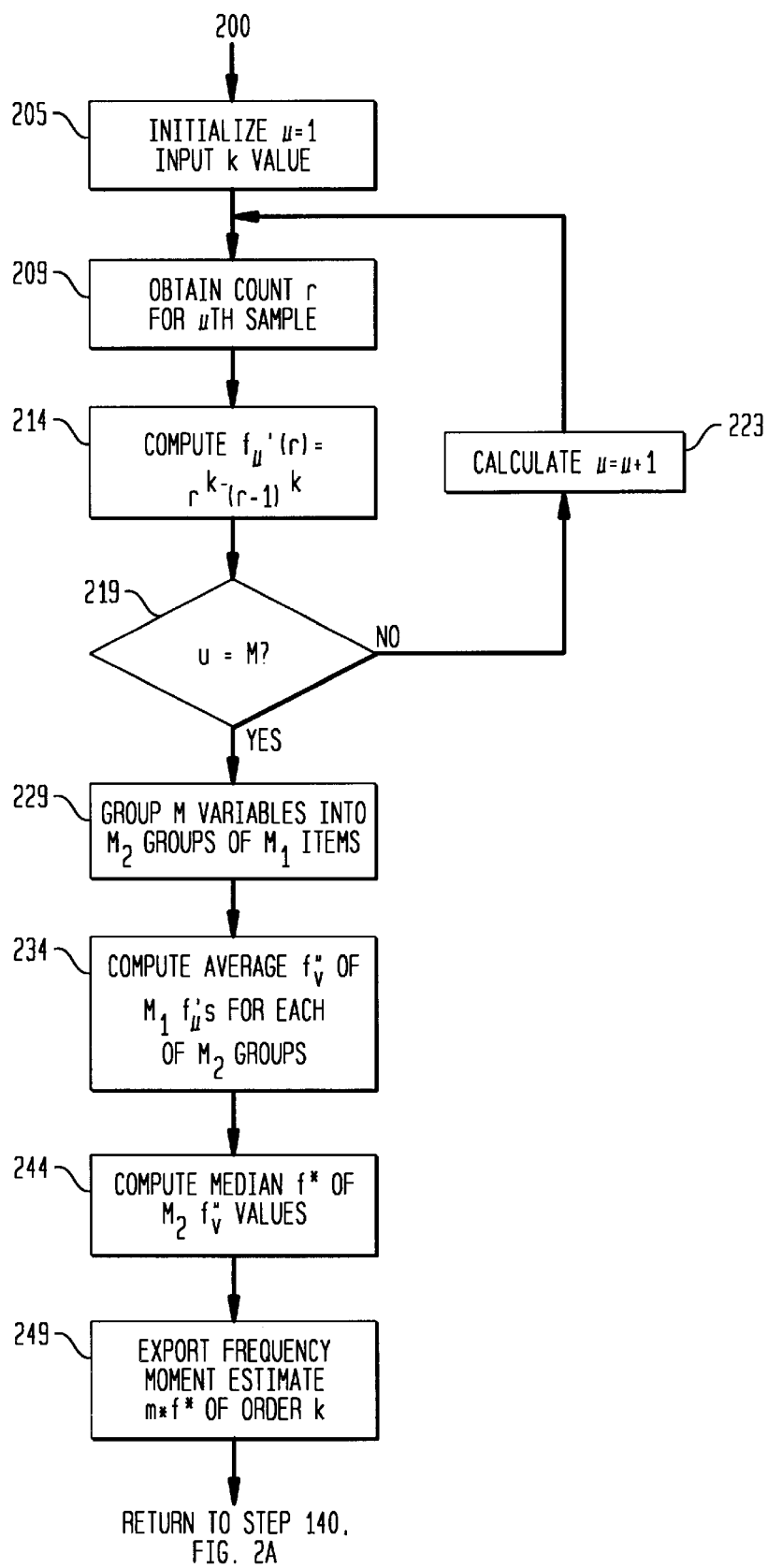
FIG. 3 is a detailed block diagram illustrating the steps for computing the frequency moment from data contained in the sample table.

As will be explained in view of FIG. 3, the frequency moment $F_k$ is determined with accuracy and a high degree of confidence by first calculating for each sample item of the sample table, a function based on the count value, $r_p$, of each sample point $a_p$, organizing the functions as groups, computing an average of all the groups, and then the computing a median value. The method for computing the frequency estimate is now described in detail as follows:

At step 205 in FIG. 3, an index u for the sample element number is initialized as 1 and the desired frequency moment order "k" is obtained as part of the demand. As indicated at step 209, for a sample element $a_p$ such that $a_p=1$, the corresponding count $r(=r_p)$, as computed in FIG. 2(a), is obtained where $r=|\{q: q \geq p, a_q=1\}|$; thus the count r is the number of items in the data set, having a value 1 which appear in the sequence after $a_p$. Then, a scaling operation is performed at step 214 by calculating a variable $f_u'(r)=(r)^k-(r-1)^k$. The count r correlates to the number of q items having a value l which appear in the sequence after "p", i.e., how many q's there are such that $a_q=l$(value) and q appears after p. $f_u'(r)$ is calculated for a frequency moment of order k. A determination is then made at step 219 as to whether $f_u'(r)$ has been calculated for the last sample item (of M items). If not, the index u is incremented at step 223 and the steps 209 and 214 are repeated until a value $f_u'(r)$ is generated for every sample element in the table.

Next, at step 229, the algorithm groups the computed variables $f_u'(r)$ into $M_2$ groups of $M_1$ values each and then, at step 234 computes an average f"(r) for each of the $M_2$ groups. This results in a quantity of $M_2$ vectors having values of $f''(r)=avg(f_u'(r))$. Next, at step 244, a median value f*(r) is computed for the quantity $M_2$ groups of f"(r). The final value f*(r) is then exported as shown at step 249, with the value m(f*(r)) being the estimate of the frequency moment $F_k$, as defined above.

Finally, an output report containing an estimate of the frequency moment is generated as indicated at step 140 (FIG. 2(*a*)).

In accordance with the principles of the invention, it can be assured that the calculated frequency moment values are good with high degree of confidence and relative accuracy. In the foregoing algorithm for computing $F_k$, the random variable $f_u'(r)$ is computed under the given space constraints, whose expected value is $F_k$, and whose variance is relatively small. For every $k \geq 1$, every $\lambda > 0$ and every $\in > 0$, where $\lambda$ represents the relative error and $\in$ represents the error probability, and given a sequence $A=(a_1, a_2, \ldots, a_m)$ of members of $\{1, 2, \ldots, n\}$, in one pass and using $$O\left(\frac{k \lg(1/\epsilon)}{\lambda^2} n^{1-\frac{1}{k}} \log(n+m)\right)$$

memory locations, the randomized algorithm of the invention computes a number Y, such that the probability of Y deviating from $F_k$ by more than $\lambda F_k$ is, at most, $\in$. The above-identified U.S. Provisional Patent Application Ser. No. 60/017,950, filed May 20, 1996, upon which this application claims priority, provides the proof.

In accordance with the foregoing, the estimate of the second frequency moment (for fixed positive $\lambda$ and $\in$) requires $o(\sqrt{n}(\log(n+m)))$ memory locations. The algorithm computes a number Y, such that the probability of Y deviating from $F_2$ by more than $\lambda F_2$ is, at most, $\in$. For fixed $\lambda$ and $\in$, the algorithm can be implemented by performing, for each member of the sequence, a constant number of arithmetic and finite field operations on elements of O(lg n+lg m) locations.

For each of the embodiments described above, a mechanism is employed for adapting the table if the data table becomes full, i.e., memory space filled, and if the total number of data items in the data base set is not known in advance or, if the size of the database increases in size, e.g., from 1 million to 1 million and one. In such an instance, since the total number of database items had increased, then, a priori, the individual indices for the table would have been selected with a probability slightly less than the probability with which it had been selected in the first place, e.g., by a factor of 1 million/1 million and one. Then, it becomes necessary to determine with what probability each subsequent number greater than the predetermined m elements (e.g., 1 million) should have been selected in the first place. This probability theoretically, is one/1 million and one. Thus, when the next (e.g., one millionth and one) element, $a_m$, arrives in the database, the element $a_1$ is replaced with the element $a_m$ having a probability 1/m, i.e., what is the probability that this m'th element would have been selected into the sample. If it is successful, then $a_1$ is removed. The counter for $a_1$ is removed and a new counter is maintained for $a_m$ keep track of the items received by the database. If $a_m = a_1$ then the counter for $a_1$ would be updated as described above.

It could be shown for every frequency moment, that if the sample is of sufficiently large size, e.g., greater than one million, the frequency moment estimate will be of good high quality. Preferably, for the second frequency moment, the number of samples (in the table) is no larger than $o(\sqrt{n}(\log(n+m)))$ with a fixed guarantee of accuracy.

In a second embodiment for calculating an estimate of the second frequency moment of a database, the randomized algorithm may be adapted as follows:

A set of M registers, $Z_i, Z_2, \ldots, Z_m$ is initialized to 0. For each register $Z_u$ there is a recorded corresponding hash function $H_u$ which maps values from $[1, \ldots, n]$ into $\{-1, 1\}$. The function $H_u$ is selected in a preprocessing stage by a probabilistic selection. A non-limiting example for a function is, e.g., $H_u(x) = 2((((ax^3 + bx^2 + cx + d) \mod p) \mod 2) - 0.5)$, where a,b,c,d are numbers chosen at random from $[1, \ldots, n]$ and p is a prime larger than n. For each new data item, $a_j$, there is computed $H_u(a_j)$ for all $u = 1, 2, \ldots, M$, and there is updated each $Z_u$ by $Z_u = Z_u + H_u(a)_j$. In other words, the value of $Z_u$ is either incremented by 1 or decremented by 1, depending on whether $H_u(a_j)$ is 1 or −1. For computing a frequency moment in this second embodiment, steps 209 and 214 in FIG. 3 may be replaced by: step 209': obtain register $Z_u$ and 214': compute $f_u' = (Z_u)^2$ respectively.

In accordance with the foregoing, it can be shown in the second embodiment that $$Z_u = \sum_{i=1}^{n} H_u(i),$$

since for each of the $m_i$ occurences of i in the sequences, there is a contribution of $H_u(i)$ to the value of $Z_u$.

Using the methhod for computing an estimate for $F_2$ in the second embodiment, the required memory to guarantee (with high probability) a good approximation is only O(log (n+m)).

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for estimating frequency moments of a database, $F_k$, the frequency moments being of the order k, with k equal to the degree of the frequency moment and $k \geq 1$, said method comprising the steps of:

receiving data elements for input to said database, each said data element being of a type;

choosing a subset of quantity M of said data elements, each said data element in said subset chosen randomly;

providing M counters, one counter for each said data element in said subset;

initializing said counters;

for each said data element input to said database, comparing said data element input to said database with each said data element in said subset and incrementing counters that correspond to those of said elements in said subset whose type is identical to the type of said data element input to said database;

computing a random variable $$f_u'(r_u) = r_u^k - (r_u - 1)^k$$

for each said data element in said subset, where $r_u$ is a current count of said counter corresponding to said data element in said subset; and processing each said random variable to determine an estimate of said frequency moment $F_k$.

2. A method for estimating frequency moments according to claim 1, wherein said database is of size m and said processing step includes the steps of:

grouping said variables $f_u'(r_u)$ into $M_2$ groups of $M_1$ elements each;

for each of said $M_2$ groups, computing an average value $f_v''$ for the $M_1$ variables;

computing a median value $f^*$ for $M_2$ quantities of $f_v''$ values obtained; and computing an estimate for $F_k$ as a value $mf^*$.

3. A method for estimating frequency moments according to claim 1, wherein said database is of size m.

4. A method for estimating frequency moments according to claim 3, wherein an estimate of a second frequency moment having k=2 is performed using on the order of $\sqrt{n}(\log(n+m))$ memory locations.

5. A method for estimating frequency moments according to claim 1, wherein each of said quantity M data elements are selected in a probabilistic manner.

6. A method for estimating frequency moments according to claim 1, wherein each of said quantity M data elements are selected a priori.

7. A method for estimating frequency moments according to claim 1, further including the step of determining when said database size increases, and replacing a previous data element of said small subset with a new database item received in accordance with a calculated probability.

8. A method for estimating frequency moments according to claim 7, wherein a plurality of identical data items are received by said database, said method further including the step of incrementing the counter for that data item a corresponding number of times.

* * * * *